United States Patent
Yoshikawa et al.

(10) Patent No.: US 12,517,036 B2
(45) Date of Patent: Jan. 6, 2026

(54) SENSITIVE FILM FOR NANOMECHANICAL SENSOR USING POLY(2,6-DIPHENYL-P-PHENYLENE OXIDE), NANOMECHANICAL SENSOR HAVING SAID SENSITIVE FILM, METHOD FOR COATING SAID SENSITIVE FILM ON NANOMECHANICAL SENSOR, AND METHOD FOR RESTORING SENSITIVE FILM OF SAID NANOMECHANICAL SENSOR

(71) Applicant: NATIONAL INSTITUTE FOR MATERIALS SCIENCE, Ibaraki (JP)

(72) Inventors: Genki Yoshikawa, Ibaraki (JP); Kota Shiba, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 730 days.

(21) Appl. No.: 17/605,342

(22) PCT Filed: Apr. 14, 2020

(86) PCT No.: PCT/JP2020/016411
§ 371 (c)(1),
(2) Date: Oct. 21, 2021

(87) PCT Pub. No.: WO2020/218086
PCT Pub. Date: Oct. 29, 2020

(65) Prior Publication Data
US 2022/0228971 A1    Jul. 21, 2022

(30) Foreign Application Priority Data
Apr. 26, 2019 (JP) ................ 2019-085845

(51) Int. Cl.
*G01N 19/00* (2006.01)
*C08J 5/18* (2006.01)
*C08J 7/04* (2020.01)

(52) U.S. Cl.
CPC ............ *G01N 19/00* (2013.01); *C08J 5/18* (2013.01); *C08J 7/0427* (2020.01); *C08J 2371/12* (2013.01)

(58) Field of Classification Search
CPC .................................................. C08L 71/12
See application file for complete search history.

(56) References Cited

U.S. PATENT DOCUMENTS

2006/0032290 A1    2/2006  Liu
2013/0133433 A1*   5/2013  Yoshikawa .......... G01N 29/022
                                                73/774

(Continued)

FOREIGN PATENT DOCUMENTS

JP    2004-361093    12/2004
WO    2011/148774    12/2011

(Continued)

OTHER PUBLICATIONS

Bassam Alfeeli, et al, Characterization of poly(2,6-diphenyl-p-phenylene oxide) films as adsorbent for microfabricated preconcentrators, Microchemical Journal, vol. 98, Issue 2, pp. 240-245, 2011 (Year: 2011).*

(Continued)

*Primary Examiner* — Alex A Rolland
(74) *Attorney, Agent, or Firm* — Wenderoth, Lind & Ponack, L.L.P.

(57) ABSTRACT

The present invention provides a nanomechanical sensor unsusceptible to water vapor, due to very low sensitivity to water vapor, that may interfere with measurement. In an embodiment of the present invention, as a sensitive film material of a nanomechanical sensor such as a surface stress sensor, poly(2,6-diphenyl-p-phenylene oxide) is utilized that is used for adsorption/concentration of a substance present in a trace amount in water or air, and represented by Formula (1) wherein n represents an integer of 1 or more. As can be (Continued)

seen from graphs showing changes over time of response signals in a case where a gas to be measured containing acetone, ethanol, and the like and nitrogen are alternately supplied to the surface stress sensor cyclically, it was confirmed that in the sensitive film of the present invention, adsorption/desorption of the components in the gas to be measured significantly occurs in response to the cyclic change, but the sensitivity to water is very low.

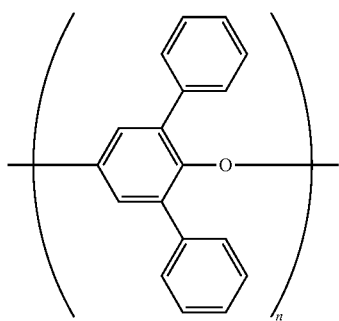

(1)

11 Claims, 6 Drawing Sheets

(56) References Cited

U.S. PATENT DOCUMENTS

2017/0184556 A1* 6/2017 Toffoli ............... G01N 33/0059
2018/0003604 A1 1/2018 Shiba et al.

FOREIGN PATENT DOCUMENTS

WO 2016/121155 8/2016
WO 2017/043562 3/2017

OTHER PUBLICATIONS

Second Office Action issued May 17, 2024 in corresponding Chinese Patent Application No. 202080031454.9, with English translation.
International Search Report issued Jun. 30, 2020 in International (PCT) Application No. PCT/JP2020/016411.
Alfeeli et al., "Characterization of poly(2,6-diphenyl-p-phenylene oxide) films as adsorbent for microfabricated preconcentrators", Microchemical Journal, vol. 98, 2011, pp. 240-245.
Yoshikawa et al., "Two Dimensional Array of Piezoresistive Nanomechanical Membrane-Type Surface Stress Sensor(MSS) with Improved Sensitivity", Sensors, vol. 12, 2012, pp. 15873-15887.
Decision of Refusal dated Feb. 14, 2023 in corresponding Japanese Patent Application No. 2021-516021, with English translation.
Notice of Reason for Refusal issued Oct. 4, 2022 in Japanese Patent Application No. 2021-516021, with English-language translation.
Office Action issued Nov. 20, 2023 in corresponding Chinese Patent Application No. 202080031454.9, with English language translation.
Communication pursuant to Article 94(3) EPC issued Oct. 13, 2023 in corresponding European Patent Application No. 20794817.5.
Communication pursuant to Article 94(3) EPC issued Mar. 27, 2024 in corresponding European Patent Application No. 20794817.5.
Extended European Search Report issued Dec. 16, 2022 in corresponding European Patent Application No. 20794817.5.
Bassam Alfeeli et al., "Characterization of poly(2,6-diphenyl-p-phenylene oxide) films as adsorbent for microfabricated preconcentrators", Microchemical Journal, vol. 98, pp. 240-245, 2011.

* cited by examiner

SENSITIVE FILM FOR NANOMECHANICAL SENSOR USING POLY(2,6-DIPHENYL-P-PHENYLENE OXIDE), NANOMECHANICAL SENSOR HAVING SAID SENSITIVE FILM, METHOD FOR COATING SAID SENSITIVE FILM ON NANOMECHANICAL SENSOR, AND METHOD FOR RESTORING SENSITIVE FILM OF SAID NANOMECHANICAL SENSOR

TECHNICAL FIELD

The present invention relates to a sensitive film for a nanomechanical sensor using poly(2,6-diphenyl-p-phenylene oxide) and to a nanomechanical sensor having this sensitive film. The present invention also relates to a method for applying this sensitive film to a nanomechanical sensor. The present invention further relates to a method for restoring a sensitive film of such a nanomechanical sensor.

BACKGROUND ART

In recent years, nanomechanical sensors have been rapidly developed that operate according to a principle different from that of a large and expensive measuring device such as chromatography, and are much smaller and easier to use for analysis than such a device. A nanomechanical sensor has a sensitive film that selectively adsorbs a substance or a group of substances as a target to be measured in a gas phase or a liquid phase, and performs analysis from a change caused by the adsorption in various physical parameters in the sensor. The nanomechanical sensor has a relatively high sensitivity despite the small and simple structure of the sensor, and, by selecting the sensitive film appropriately, the nanomechanical sensor can be applicable to a wide range of substances as a target to be measured.

The inventors of the present application have focused on surface stress sensors, among nanomechanical sensors, that detect a change in the surface stress in a receptor layer due to adsorption of a substance to the receptor layer. Surface stress sensors used usually have been a cantilever-type surface stress sensor in which a long thin plate as a cantilever is fixed only at one end, and a receptor layer is coated on the surface of the cantilever. In such a surface stress sensor, a deflection is detected that is generated in the cantilever due to a change in the surface stress in the receptor layer. Unlike such a type of surface stress sensor, the inventors of the present application have invented a Membrane-type Surface stress Sensor (MSS) having a structure in which a membrane, not a cantilever, having a shape such as a circle or a square is fixed at a plurality of portions in the periphery of the membrane to a peripheral substrate with a support beam having a width narrower than that of the membrane. In the MSS, the surface stress applied to the membrane is concentrated on the support beam, and a change in the stress is detected. Therefore, the sensitivity is greatly improved as compared with a cantilever-type surface stress sensor, and the MSS is unsusceptible to mechanical disturbance or the like. The specific structure, method of preparation, operation, characteristics, and the like of the MSS are already well known and thus will not be specifically described in the present application, but refer to Patent Literature 1, Non Patent Literature 2, and the like if necessary.

As a target to be detected with a nanomechanical sensor such as a surface stress sensor, there are a great variety of chemical substances. The substance of the odor is considered to be, although not limited to, a reaction of the olfactory organ to a gas in which a large number of chemical substances are mixed at a certain ratio, so that such a mixture of a large number of chemical substances is to be identified to realize an odor sensor with a nanomechanical sensor. For identification or discrimination of a single chemical substance or a mixture of a large number of chemical substances, many kinds of sensitive film materials having not only large but also different responsiveness depending on the kind of a chemical substance are prepared, and output of a single nanomechanical sensor or a combination of output of a plurality of nanomechanical sensors is analyzed according to a target to be measured. In the single nanomechanical sensor, a sensitive film prepared with one kind of material is used. In the plurality of nanomechanical sensors, sensitive films prepared with each of a plurality of kinds of materials are used, respectively. Therefore, a large number of sensitive film materials are required that respectively have unique responsiveness to a large number of chemical substances as a target to be measured.

In a case where a sample as a target to be analyzed is provided in the form of a gas, the sample gas often contains water vapor. In particular, exhaled breath of an animal such as a human contains water vapor at a concentration in or close to a saturated state. Also, in a case where, for example, exhaust gas from a factory or the like is used as a sample gas, it often contains a large amount of water vapor. Therefore, a sensitive film material is also required that has low hygroscopicity, high sensitivity, and unique responsiveness so that the influence on the detection of a trace component is small even in measurement of a sample gas containing a large amount of water vapor.

SUMMARY OF INVENTION

Technical Problem

An object of the present invention is to provide a sensitive film for a nanomechanical sensor having characteristics such as low sensitivity to water vapor and high sensitivity to acetone by employing poly(2,6-diphenyl-p-phenylene oxide) that has not been conventionally used as a sensitive film material, and thus further increase the variety of such sensitive films.

Solution to Problem

According to one aspect of the present invention, a sensitive film for a nanomechanical sensor is provided that comprises poly(2,6-diphenyl-p-phenylene oxide) represented by Formula (1) described below.

Here, the nanomechanical sensor may be a surface stress sensor.

According to another aspect of the present invention, a nanomechanical sensor is provided that has a sensitive film comprising poly(2,6-diphenyl-p-phenylene oxide) represented by Formula (1) described below.

Here, a surface stress sensor may be used as the nanomechanical sensor.

According to still another aspect of the present invention, a method for restoring a sensitive film of a nanomechanical sensor is provided that comprises a step of raising a temperature of the sensitive film of the nanomechanical sensor according to any one of the above-described aspects to a temperature from 200° C. to 400° C.

According to still even another aspect of the present invention, a method for coating a sensitive film on a nanomechanical sensor is provided that comprises coating, on a nanomechanical sensor, a solution in which a material containing poly(2,6-diphenyl-p-phenylene oxide) represented by Formula (1) described below is dissolved in a solvent.

Here, the solution may be coated on the nanomechanical sensor with an inkjet method.

The solvent may be trichloroethylene.

The nanomechanical sensor during coating a sensitive film may be kept to have a temperature at which poly(2,6-diphenyl-p-phenylene oxide) in the sensitive film is crystalline.

The nanomechanical sensor during coating a sensitive film may be kept to have a temperature at which poly(2,6-diphenyl-p-phenylene oxide) in the sensitive film is amorphous.

Advantageous Effects of Invention

According to the present invention, a sensitive film is provided for a nanomechanical sensor, that exhibits a small response to water vapor but exhibits a large response to a part of other gases, and a nanomechanical sensor in which this sensitive film is used. In addition, by heating the sensitive film of the present invention at a high temperature, an accumulated component that is not easy to remove by flowing a purge gas is removed easily without damaging the sensitive film. As a result, the sensitive film for a nanomechanical sensor of the present invention can be easily restored. Furthermore, the sensitive film for a nanomechanical sensor of the present invention can be prepared with a simple method for coating, on a nanomechanical sensor, a solution in which a predetermined material is dissolved in a solvent.

DESCRIPTION OF EMBODIMENTS

Figure 1:
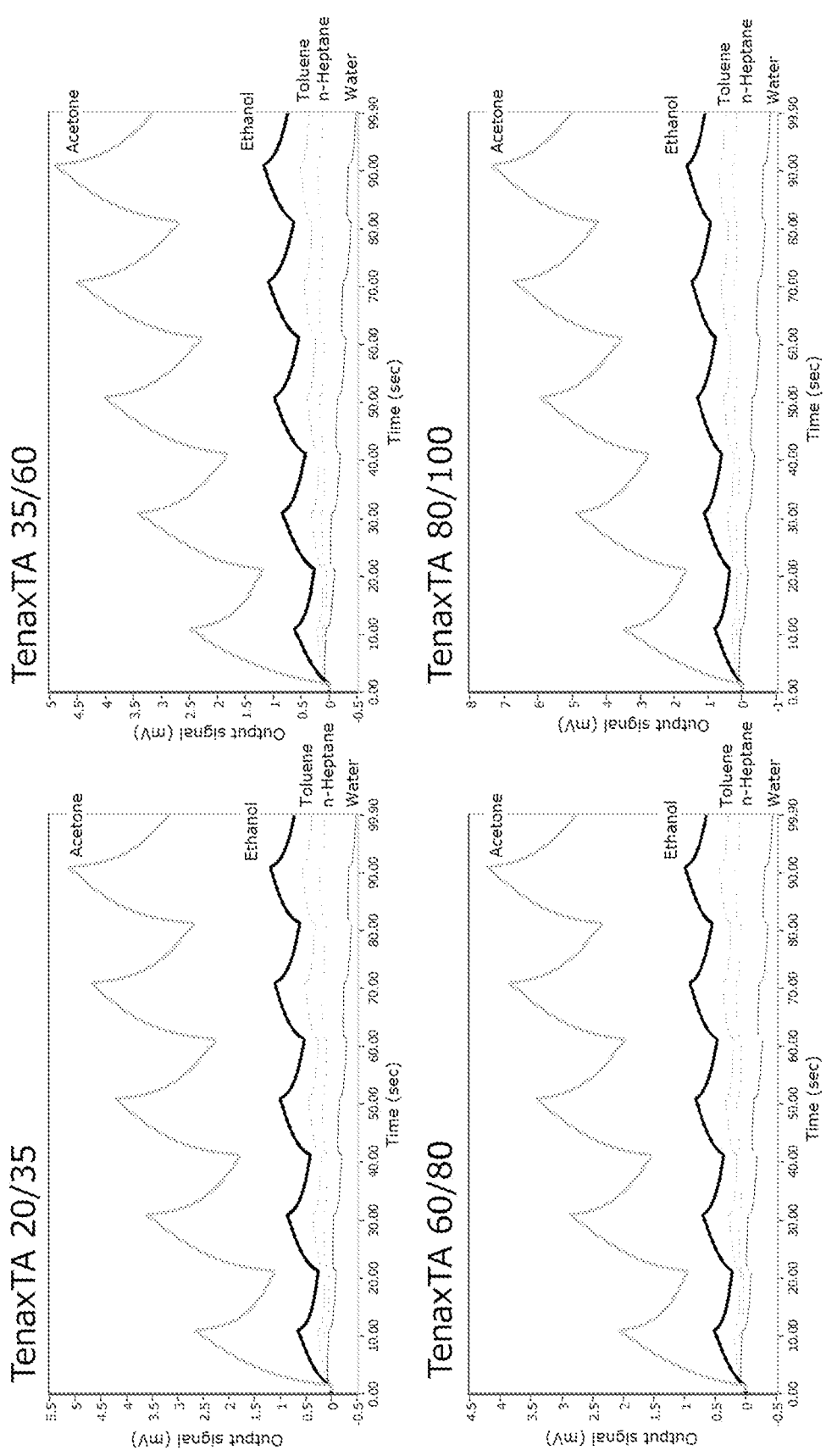
FIG. 1 shows graphs showing changes over time of output signals measured by supplying each of five solvent vapors of acetone, toluene, ethanol, water, and n-heptane as a sample gas and a dry nitrogen gas as a purge gas alternately to MSS having a receptor prepared using Tenax TA (20/35, 35/60, 60/80, or 80/100) at a substrate temperature of 20° C.

Hereinafter, a surface stress sensor will be described as a representative example of the nanomechanical sensor, and a Membrane-type Surface stress Sensor (MSS) will be described as an example of a specific type of the surface stress sensor, but it should be noted that the sensor is not intended to be limited thereto.

Poly(2,6-diphenyl-p-phenylene oxide) is a material having a chemical structure represented by Formula (1) described below, and also known as "Tenax" (registered trademark), and is used as a column material for chromatography and also used for adsorption and concentration of a minute amount of substance present in water or air. Hereinafter, poly(2,6-diphenyl-p-phenylene oxide) is referred to as Tenax. Several types of Tenax are commercially available depending on the purity and an additive, and are called Tenax TA, Tenax GR (Tenax GR is obtained by adding graphite carbon at a content of 23% at the time of polymerization of Tenax), and the like in which a suffix is appended to the term "Tenax" (for example, see the first paragraph in the item "1. Introduction" of Non Patent Literature 1). It should be noted that the term "Tenax" encompasses all the types of Tenax except as otherwise expressly stated or otherwise apparent from context in the present application.

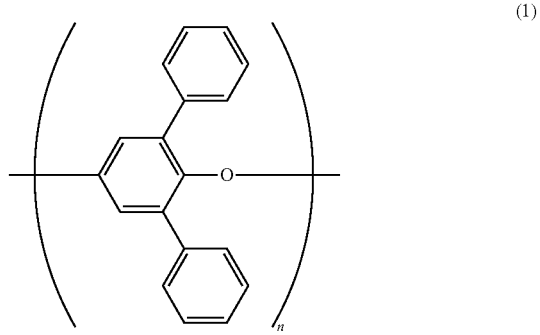

(1)

In Formula (1), n is an arbitrary integer of 1 or more, and Formula (1) naturally represents a chemical structure having a high polymerization degree from several thousands to several tens of thousands. n is preferably in the range of 35 or more and 10,000 or less. A more preferable case in which the molar mass is 0.5 to $1 \times 10^6$ g/mol is described in Non Patent Literature 1 at near the beginning of page 241. Here, a monomer of Tenax has a molar mass of 274.4 g/mol, and therefore the polymerization degree n in the case in Non Patent Literature 1 is in the range of 1,800 to 3,700.

The particle size distribution of Tenax depends on the type of Tenax provided, and the range of the particle size is shown with a representation of the mesh, such as Tenax TA 20/35. Also in the present application, this representation is employed in referring to specific type of Tenax in Examples and the like.

For an adsorption characteristic of Tenax, see, for example, Non Patent Literature 1. As can be seen from the fact that this material is used in the fields of chromatography and substance concentration, this material has a large adsorption capability. However, such a large adsorption capability does not necessarily lead to a large change in the surface stress as a physical parameter that can be detected by a surface stress sensor.

As is well known, Tenax has a large adsorption capability, and as can be seen from the fact that Tenax is used for concentration, a substance once adsorbed on Tenax is not easily desorbed, and therefore an operation of heating Tenax to desorb the adsorbed substance is usually employed. In the case of detecting a gas or the like with a surface stress sensor, a sample gas that may contain a component as a target to be detected and an inert gas such as a nitrogen gas (referred to as purge gas) are alternately and cyclically supplied to the surface stress sensor, thus adsorption and desorption of the component to and from the sensitive film on the sensor are repeated, and the resulting cyclic output signal from the surface stress sensor is analyzed. That is, the sensitive film material for the surface stress sensor is to have ability not only to adsorb the desired component well but also to easily desorb the adsorbed component by being supplied with the purge gas. Such a property for easy desorption is important not only during a cyclic operation for single measurement, but also from the viewpoint of a characteristic, usually required for this type of sensor, for realization of improvement in the reproducibility and the stability of measurement, facilitation of handling of the sensor, improvement in the measurement throughput, prolongation of the life of the sensor (sensitive film), and the like by minimizing the influence of a history of past measurement on an output signal at the time of measurement newly performed. Therefore, it has been generally considered that a material used for concentration is not suitable as a material for a sensitive film for a surface stress sensor. As far as the inventors of the present application know, Tenax has not been used as a sensitive film material for a surface stress sensor.

Nevertheless, the inventors of the present application used Tenax as a sensitive film material of a surface stress sensor, and measured the responsiveness to various gases as shown in Examples. As a result, it has been surprisingly found not only that a large output signal can be obtained at the time of adsorption in the sample gas supply phase for various components to be typically employed for confirming a characteristic of the surface stress sensor, such as, at least, the components used as a sample to be measured in Examples, but also that in the purge gas supply phase, a desorption characteristic is exhibited that is not significantly different from those of polymers conventionally used by the inventors of the present application as a sensitive film material. That is, it has been found that in the purge gas supply phase (during 10 seconds in Examples), the output signal intensity increased in the sample gas supply phase (also during 10 seconds in Example) returns to a value close to the output signal intensity at the start time of the sample gas supply phase without extending the time of the purge gas supply phase greatly, in other words, the change in the output signal shows a sawtooth shape rather than a stepwise shape. In addition, in terms of the sensitivity, it has been confirmed that high sensitivity equal to or higher than that of a conventionally used general polymer can be obtained, and extremely low detection output is provided for water (water vapor) that is present in a large amount in many kinds of sample gases and often causes adverse effects such as instability of a measurement result and a decrease in the sensitivity due to masking of a trace component. On the basis of the above-described findings, the inventors of the present application have invented, by using Tenax, a novel sensitive film for a surface stress sensor in which the sensitivity is high and the above-described adverse effects of water are suppressed, and a novel surface stress sensor in which such a sensitive film is used.

A sensitive film using Tenax has particularly high sensitivity to acetone, and relatively high sensitivity to ethanol. It means that the sensitive film using Tenax responds to a polar gas molecule. In addition to that, the sensitive film using Tenax exhibits a certain level of responsiveness to a non-polar molecule such as toluene. Moreover, as can be seen from the fact that Tenax is used for concentration, Tenax has a large adsorption amount. Therefore, Tenax is not easily saturated even if supplied with a sample having a high concentration, so that a sensor having a large dynamic range can be realized. Furthermore, Tenax has high heat resistance (withstands up to a high temperature of about 400° C.). Therefore, in the case of occluding a component difficult to desorb in a large amount, the occluded component in the sensitive film can be purged (pushed out) by heating without significantly damaging the sensitive film. In a sensitive film in which a conventional material is used, a response characteristic of the sensitive film is sometimes changed due to accumulation of a component that cannot be easily desorbed by only flowing a purge gas. In the present invention, the heat resistance of Tenax is utilized to restore the sensitive film easily by heating. Although not shown in Examples, MSS having a sensitive film using Tenax were heated to 200° C. and 300° C. to restore the sensitive film. As a result, the sensitive film subjected to the restoration treatment at 200° C. showed the largest responsiveness. In the case of the restoration treatment at 300° C., the responsiveness slightly deteriorated, but the sensitive film showed a sufficiently good characteristic. As described above, Tenax withstands, that is, does not largely change irreversibly up to a high temperature of 400° C., so that it can be said that MSS having Tenax as a sensitive film may be heated to 400° C. in restoration treatment. By contrast, in the case of a general polymer, the melting point is about 100° C. to 200° C., so that the sensitive film cannot be restored in the high temperature range of 200° C. to 400° C.

Examples of the method of preparing a sensitive film using Tenax include a method in which Tenax in a state of being dissolved in a solvent such as trichloroethylene (TCE) is coated on a surface stress sensor with an inkjet method. Here, characteristics of Tenax greatly depend on the temperature of the surface portion subjected to inkjet application on the surface stress sensor (hereinafter referred to as substrate for simplicity). That is, it is known that Tenax forming a sensitive film is crystalline and has a small adsorption amount at a substrate temperature of about 20° C., but at about 100° C., Tenax is amorphous, and the adsorption amount is increased (see, for example, Non Patent Literature 1, the end of the item 3.1. Tenax TA physical characteristics). By using this property, it is possible to control characteristics of the sensitive film to some extent by controlling the substrate temperature in the sensitive film forming process even if the same type of Tenax is used.

As described above, a thin film that can be used as a sensitive film can be formed with a method that is widely used, has a well-known feature, characteristic, and the like, and employs easily available equipment, such as a method in which Tenax is dissolved in a solvent and the resulting solution is coated on a surface stress sensor with an inkjet method, so that a Tenax-based sensitive film can be easily prepared using existing methods, findings, equipment, and the like. Examples of the method of application that can be used for preparation of a Tenax-based sensitive film include, in addition to an inkjet method described above, various vapor deposition methods such as a super inkjet method, a spin coating method, and plasma chemical vapor deposition;

an electroplating method; a dispenser method; a dipping method; a roll coater method; a slit coater method; a spray method; various dynamic coating methods; and various static coating methods. It is known that the Tenax formed into a thin film through the application well keeps the porosity of the Tenax particle used as a raw material, so that a treatment method of imparting porosity to the sensitive film is not to be newly developed, and even if an existing method is available, treatment for the existing method is not to be performed.

In Examples described below, sensitive films were prepared using Tenax TA, which has the highest purity among commercial products of Tenax. However, even if a sensitive film is prepared by mixing different types of Tenax each containing a different impurity in a different amount or by mixing another substance with Tenax, the sensitive film basically has a characteristic obtained by superimposition of the characteristics of Tenax and the impurities or a mixed substance (hereinafter, the impurities and the mixed substance are collectively referred to as mixed substance). For example, the sensitive film may have improved sensitivity to a gas to which the mixed substance is easily adsorbed. Alternatively, by mixing another substance, a characteristic may be obtained that is different from the characteristic imaged from the term "superimposition", that is, non-linear and difficult to predict from the characteristic of the original mixed substance itself. Therefore, it should be noted that the present invention encompasses not only a sensitive film consisting of only Tenax but also a sensitive film made of a material containing another mixed substance in addition to Tenax.

EXAMPLES

In Examples, four types of Tenax TA with four particle size distributions, that is, Tenax TA 20/35, Tenax TA 35/60, Tenax TA 60/80, and Tenax TA 80/100 were used as Tenax. These Tenax TA were obtained from GL Sciences Inc. Each Tenax was dissolved in TCE at a concentration of 1 g/L, and the resulting solution was coated on the surface that detects the surface stress of MSS, that is, a substrate defined above, by dropping 300 droplets of the solution. At this time, the substrate temperature was set to three temperatures of 20° C., 50° C., and 80° C.

Figure 2:
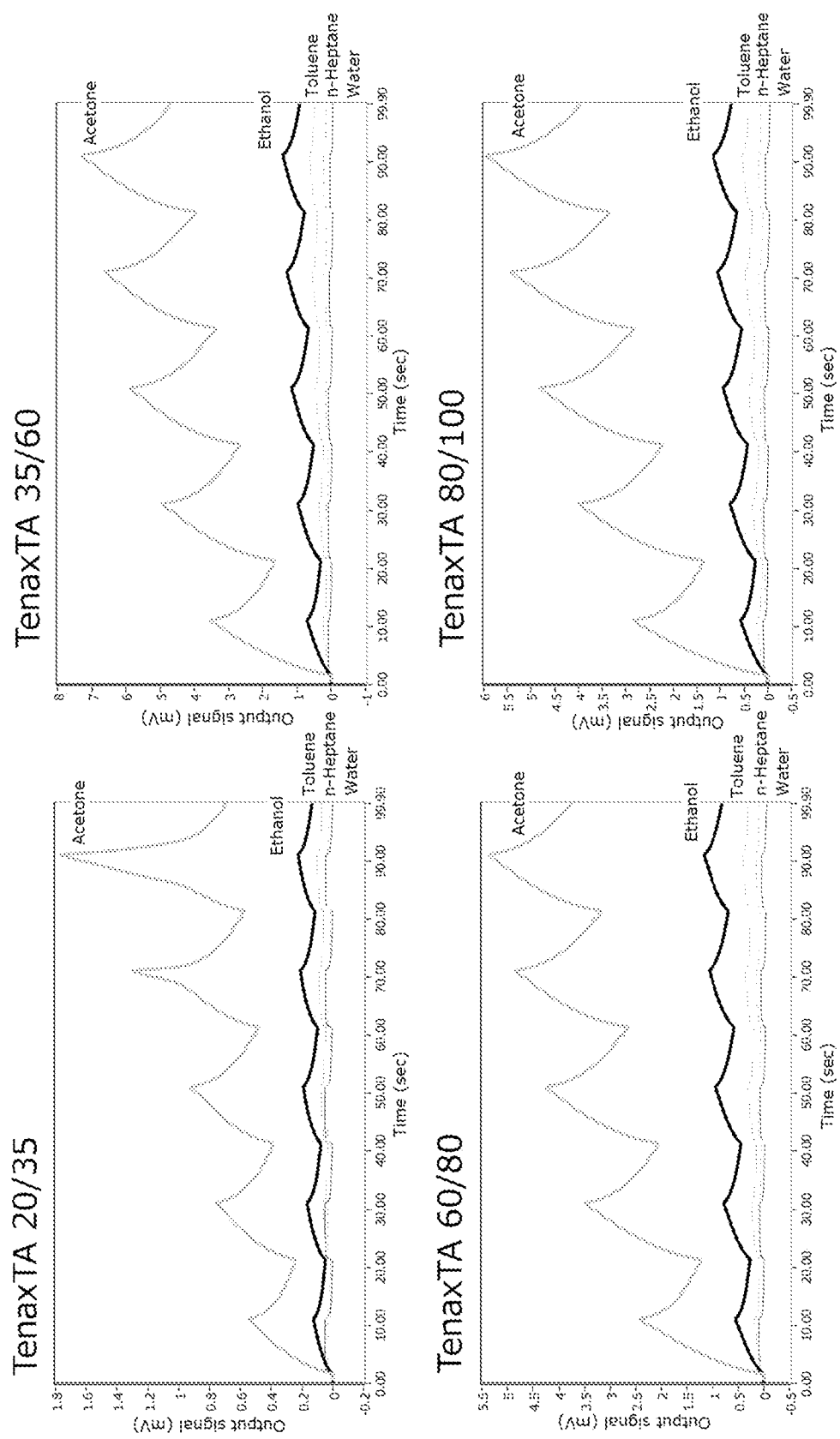
FIG. 2 shows graphs showing changes over time of output signals measured by supplying each of five solvent vapors of acetone, toluene, ethanol, water, and n-heptane as a sample gas and a dry nitrogen gas as a purge gas alternately to MSS having a receptor prepared using Tenax TA (20/35, 35/60, 60/80, or 80/100) at a substrate temperature of 50° C.
Figure 3:
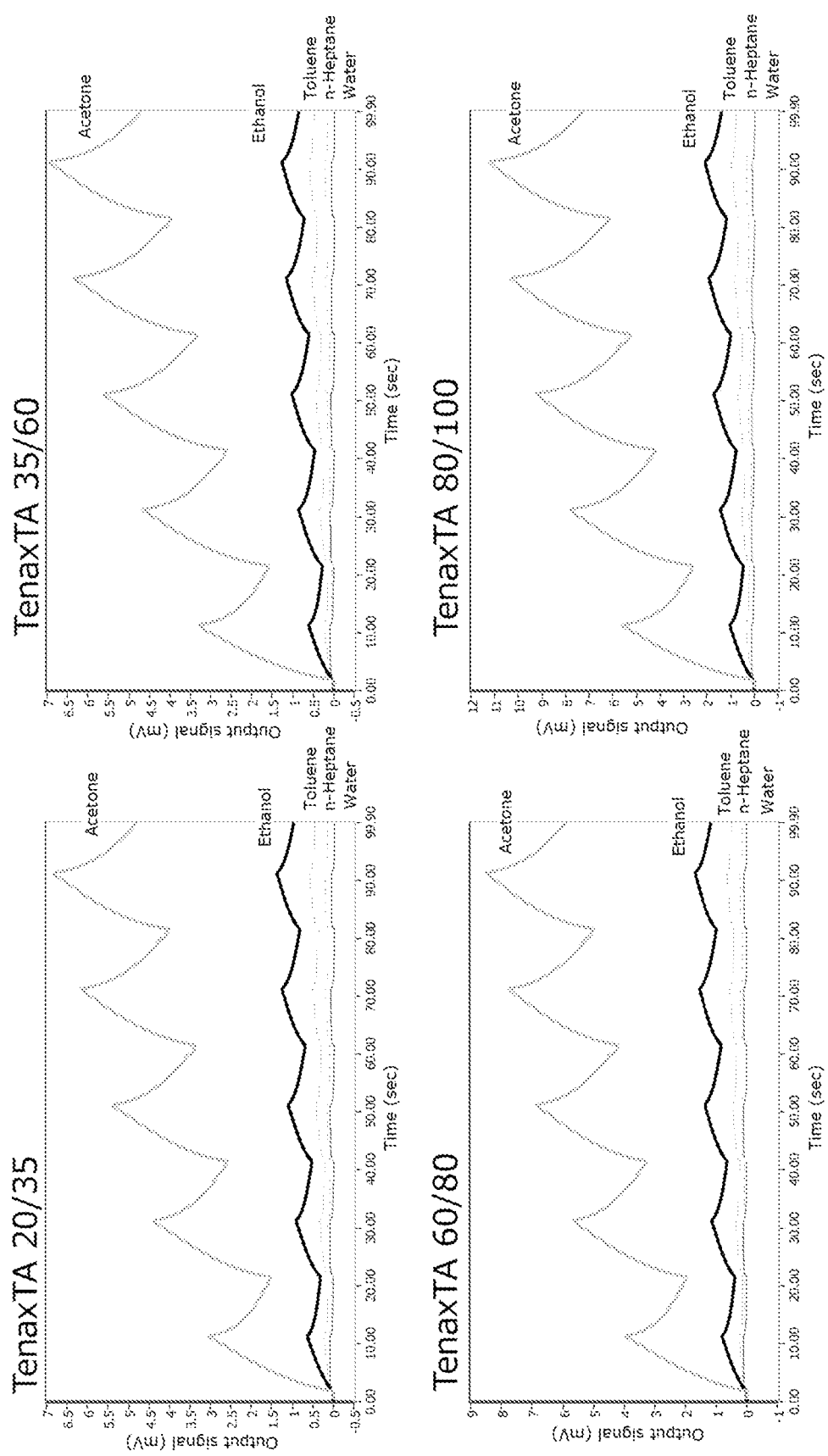
FIG. 3 shows graphs showing changes over time of output signals measured by supplying each of five solvent vapors of acetone, toluene, ethanol, water, and n-heptane as a sample gas and a dry nitrogen gas as a purge gas alternately to MSS having a receptor prepared using Tenax TA (20/35, 35/60, 60/80, or 80/100) at a substrate temperature of 80° C.

Using thus prepared MSS having 12 kinds of Tenax-sensitive films (that is, 12 kinds of sensitive films obtained by combining 4 types of particle size distributions of Tenax TA dissolved in TCE and 3 patterns of substrate temperatures), a cycle was repeated in which one of 5 solvent vapors of acetone, toluene, ethanol, water, and n-heptane as a sample gas and a dry nitrogen gas (nitrogen gas free of water vapor) as a purge gas were alternately supplied every 10 seconds at a flow rate of 100 sccm, and a change in the output signal of the MSS depending on a change in the surface stress of the sensitive film caused by the repeat of the cycle was recorded. Here, the temperature of each of the sample gas and the purge gas was 25° C., and the temperature of the measurement system was also adjusted to 25° C. so that the temperature was kept until these gases were supplied to the MSS. FIGS. 1 to 3 show the measurement results. The concentration of the solvent vapor in the sample gas thus supplied to the MSS depends on the vapor pressure of the solvent. The solvent vapor was obtained by blowing a dry nitrogen gas into the solvent, and the concentration of each solvent vapor converted from the vapor pressure of the solvent is as follows.

Toluene: 38,000 ppm
Ethanol: 86,000 ppm
Water: 31,000 ppm
n-Heptane: 59,000 ppm

In Examples, these saturated solvent vapors were used not as they were but in a state of being diluted with a dry nitrogen gas at a constant ratio, and the resulting gas was supplied to the MSS as a sample gas for measurement.

FIGS. 1 to 3 show output signals from the MSS in which sensitive films are formed at substrate temperatures of 20° C., 50° C., and 80° C., respectively. The description of "Preparation conditions of sensitive films: 300 shots, 20° C." in the upper part of FIG. 1 indicates that the graphs show output signals of MSS for solvent vapors in the case of using MSS having a Tenax-sensitive film formed by dropping 300 droplets of a TCE solution of Tenax TA using an inkjet spotter onto the detection surface of the MSS having a temperature kept at 20° C. The same applies to the similar description in the other drawings.

Such measurement was performed in a measurement system having a well-known configuration same as that of a generally used conventional measurement system in which the sample gas and the purge gas are alternately supplied and the output from the sensor responding to the alternate supply is measured as described above, and the configuration will not be described any further.

As is well known, the signal system of this type of sensor is a direct current (DC) circuit, and therefore, the output signal has a DC offset in most cases. It is difficult to compare output signals with a remaining DC offset. Therefore, it should be noted that all the output signals in Examples are signals obtained by removing the DC offset by a known method. Specifically, the offset value was determined to be a value of the output signal at the time immediately before the introduction of the sample gas purged for a certain period of time before the start of measurement.

Figure 4:
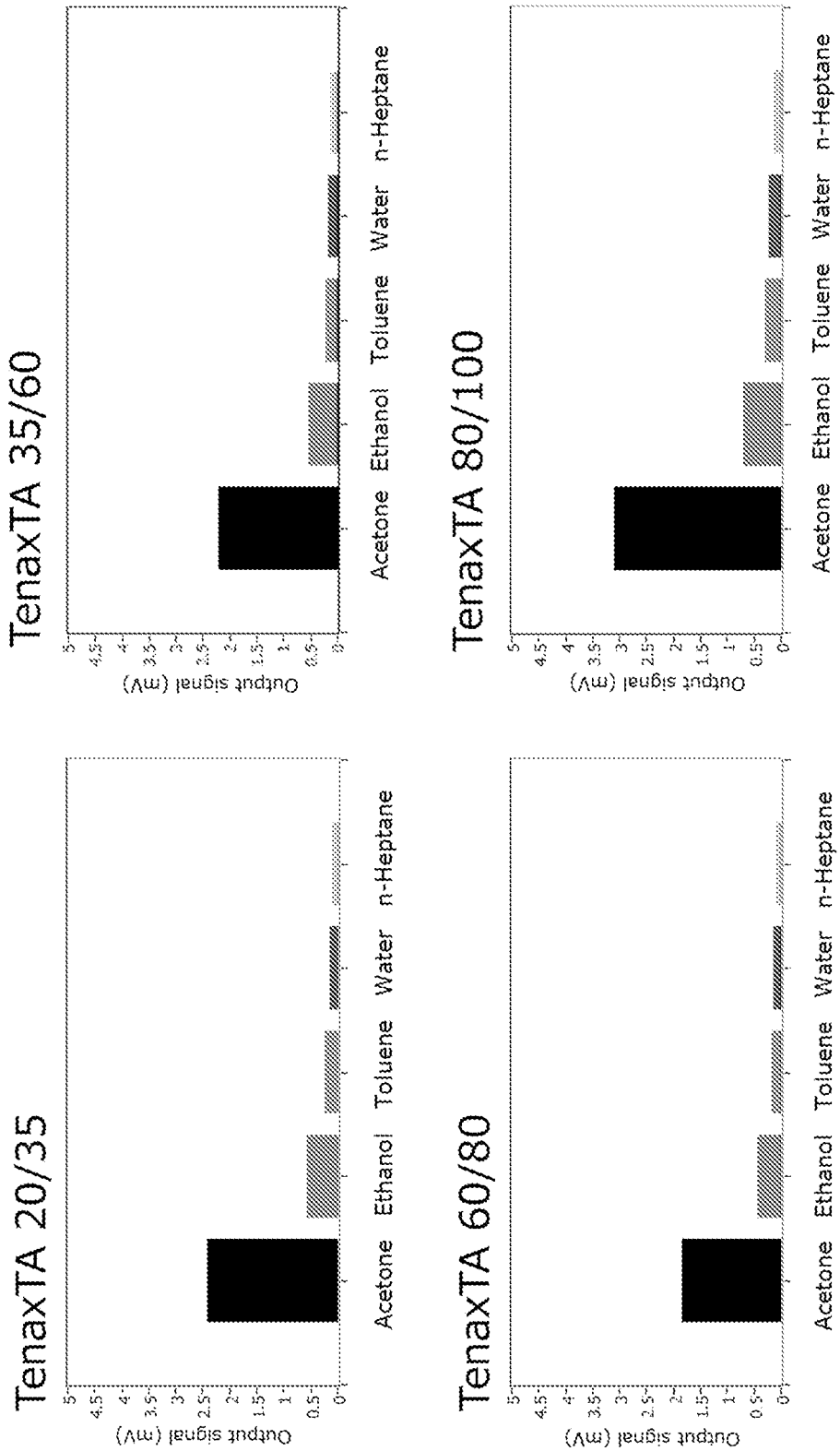
FIG. 4 shows graphs showing results of determination, for each solvent, of the maximum amplitude value of the output signal for each solvent vapor shown in FIG. 1.
Figure 5:
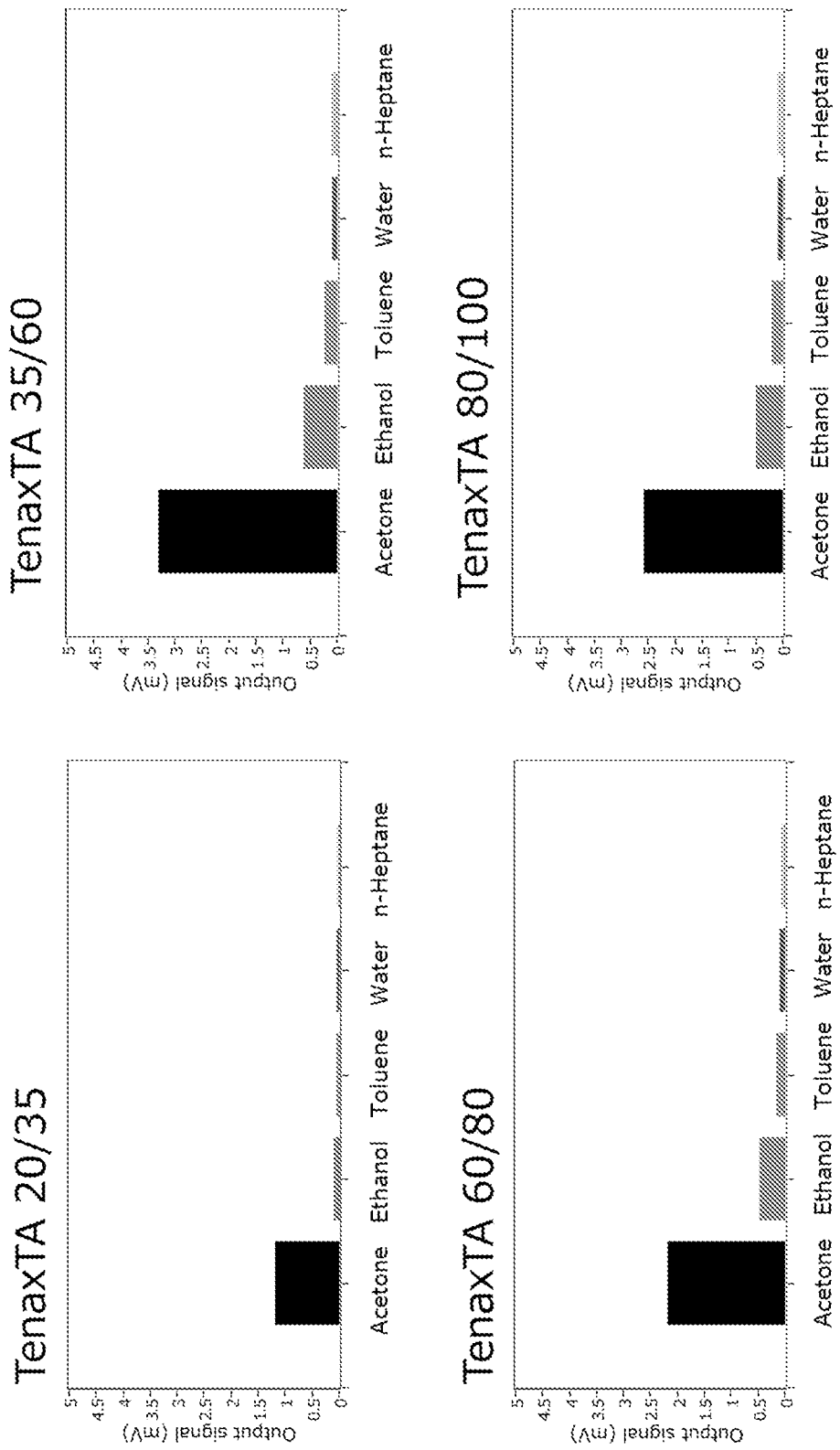
FIG. 5 shows graphs showing results of determination, for each solvent, of the maximum amplitude value of the output signal for each solvent vapor shown in FIG. 2.
Figure 6:
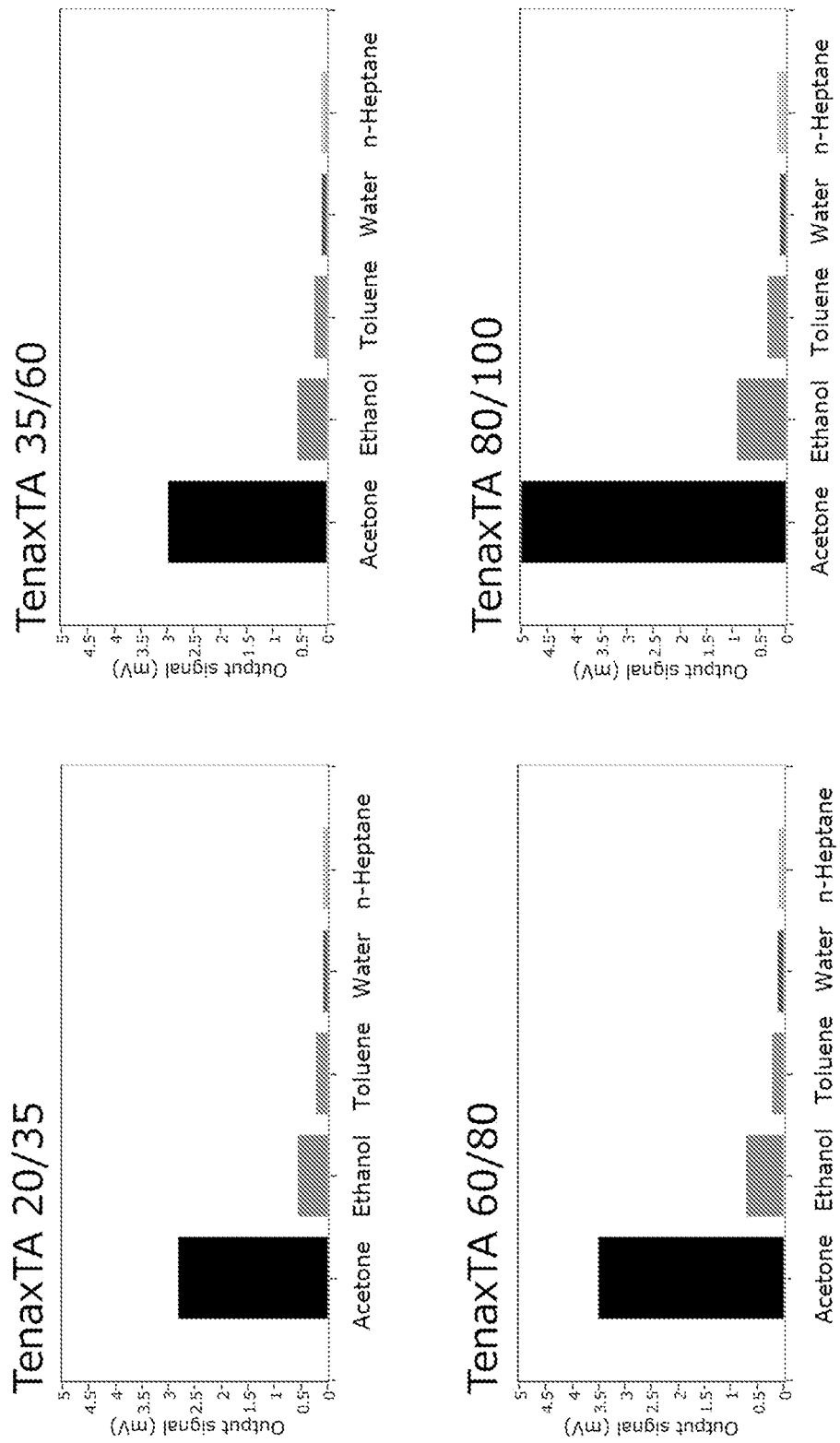
FIG. 6 shows graphs showing results of determination, for each solvent, of the maximum amplitude value of the output signal for each solvent vapor shown in FIG. 3.

In Examples, the maximum amplitude value of the output signal for each solvent vapor was further determined for each solvent. FIGS. 4 to 6 show the results.

From FIGS. 1 to 3 showing the responses of the Tenax-based sensitive films to the alternate supply of the sample gas and the purge gas, that is, the output signals from the MSS having the sensitive films, it can be seen that the output signals increase and decrease in response to the alternate supply of the sample gas and the purge gas. These results indicate that the Tenax-based sensitive film adsorbs the solvent vapor in the sample gas, but the adsorbed solvent vapor is not kept almost as it is, and that the Tenax-based sensitive film cyclically operates as required as a sensitive film so that the Tenax-based sensitive film adsorbs the solvent vapor during a period in the atmosphere containing the solvent vapor, while the solvent adsorbed in the sensitive film is desorbed in a relatively short time (10 seconds in Examples) and released into the purge gas in the atmosphere free of the solvent vapor, that is, during supplying the purge gas. The characteristic of the Tenax-based sensitive film to operate cyclically as described above is combined with the large adsorption capability of Tenax to indicate the potential for Tenax to be suitable as a sensitive film material for a nanomechanical sensor such as a surface stress sensor.

As can be immediately understood from FIGS. 1 to 6, from the output of the MSS in which Tenax was used as a sensitive film, it can be seen that large output is obtained for acetone and ethanol (particularly for acetone), but the output for water is very small as compared with acetone and ethanol. This fact is considered to reflect the superhydrophobicity of Tenax. By utilizing the very small relative sensitivity to water described above, various advantageous measurement can be performed, for example, in which a substance unsusceptible to water vapor, such as acetone or ethanol, in the sample gas is detected or quantified by using the Tenax-based sensitive film singly, or in which MSS having the Tenax-based sensitive film is used together with MSS having a sensitive film in which another material is used, the output from the plurality of MSS are combined for various signal processing and post-processing using machine learning, artificial intelligence, or the like to exclude the influence of water vapor as much as possible.

In Examples, measurement was performed using a plurality of kinds of Tenax-based sensitive films. In preparation of the plurality of kinds of Tenax-based sensitive films from a Tenax solution, the substrate temperature and the particle size of Tenax as a raw material were varied. As shown in FIGS. 1 to 6, it can be seen that in the samples, the relative sensitivity and the output signal waveform depend on the substrate temperature and the particle size. From these results, it can be seen that even if the same type of Tenax is used, characteristics of the sensitive film can be controlled to some extent by the preparation conditions of the sensitive film.

Furthermore, as described above, the Tenax-based sensitive film provides particularly large output for acetone. By using this characteristic, measurement of acetone having a low concentration can be easily realized under suppressed influence of the presence of water vapor in the sample gas without using a complicated measuring device or post-processing, or in an aspect in which a complicated measuring device and post-processing are used at a minimum even if used.

INDUSTRIAL APPLICABILITY

As described above, the nanomechanical sensor according to the present invention has very low sensitivity to water vapor. Therefore, the nanomechanical sensor is useful for, for example, analysis of a sample gas containing water vapor, and expected to be widely used in industry.

CITATION LIST

Patent Literature

Patent Literature 1: WO 2011/148774 A

Non Patent Literature

Non Patent Literature 1: Bassam Alfeeli, Vaibhav Jain, Richard K. Johnson, Frederick L. Beyer, James R. Heflin, and Masoud Agah, Microchemical Journal 98 (2011) 240-245.
Non Patent Literature 2: G. Yoshikawa, T. Akiyama, F. Loizeau, K. Shiba, S. Gautsch, T. Nakayama, P. Vettiger, N. Rooij and M. Aono, Sensors, 2012, 12, 15873-15887.

The invention claimed is:

1. A method of using a sensitive film for a measurement using a nanomechanical sensor, the method comprising:
    coating, on the nanomechanical sensor, a solution in which a material containing a compound represented by Formula (1) is dissolved in a solvent so that the sensitive film is formed,

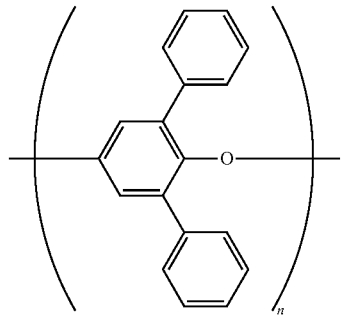

wherein n represents an integer of 1 or more, wherein:
    the material is selected based on its particle size and/or particle size distribution, and
    during coating the solution, the temperature of the nanomechanical sensor is controlled such that adsorption and/or desorption characteristics of the sensitive film are controlled, and
performing the measurement using the nanomechanical sensor, wherein:
    a sample gas containing a component as a target to be measured and a purge gas are alternately and/or cyclically supplied to the nanomechanical sensor, wherein a temperature of the sample gas and the purge gas is set to a predetermined temperature and a temperature of a measurement system is adjusted to the predetermined temperature so that the temperature of the sample gas and the purge gas is maintained until each of the sample gas and the purge gas is supplied to the nanomechanical sensor, and
    during supplying the sample gas at the predetermined temperature, the compound adsorbs the component from the sample gas, and, during supplying the purge gas at the predetermined temperature, the compound desorbs the component, wherein, with respect to a plurality of different sample gases, a relative sensitivity of the sensitive film changes depending on the adsorption and/or desorption characteristics of the sensitive film.

2. The method according to claim 1, wherein the solution is coated on the nanomechanical sensor with an inkjet method.

3. The method according to claim 1, wherein the solvent is trichloroethylene.

4. The method according to claim 1, wherein the temperature of the nanomechanical sensor is kept at 20° C. to 100° C.

5. The method according to claim 1, wherein the measurement is performed using an output signal from the nanomechanical sensor resulting from adsorption and desorption of the component to and from the sensitive film comprising the compound on the nanomechanical sensor, wherein, with respect to the plurality of different sample gases, an output signal waveform changes depending on the adsorption and/or desorption characteristics of the sensitive film.

6. The method according to claim 5, wherein the measurement is performed using both an output signal during supplying the sample gas at the predetermined temperature and an output signal during supplying the purge gas at the predetermined temperature.

7. The method according to claim 1, further comprising, after performing the measurement using the nanomechanical sensor, a step of raising a temperature of the sensitive film of the nanomechanical sensor to a temperature from 200° C. to 400° C.

8. The method according to claim 1, wherein the nanomechanical sensor is a surface stress sensor.

9. The method according to claim 8, wherein, during coating the solution, a substrate temperature of the surface stress sensor is controlled such that adsorption and/or desorption characteristics of the sensitive film are controlled.

10. The method according to claim 9, wherein the substrate temperature of the surface stress sensor is kept at 20° C. to 100° C.

11. The method according to claim 10, wherein the substrate temperature of the surface stress sensor is kept at 20° C. to 80° C.

* * * * *